Patented Aug. 23, 1938

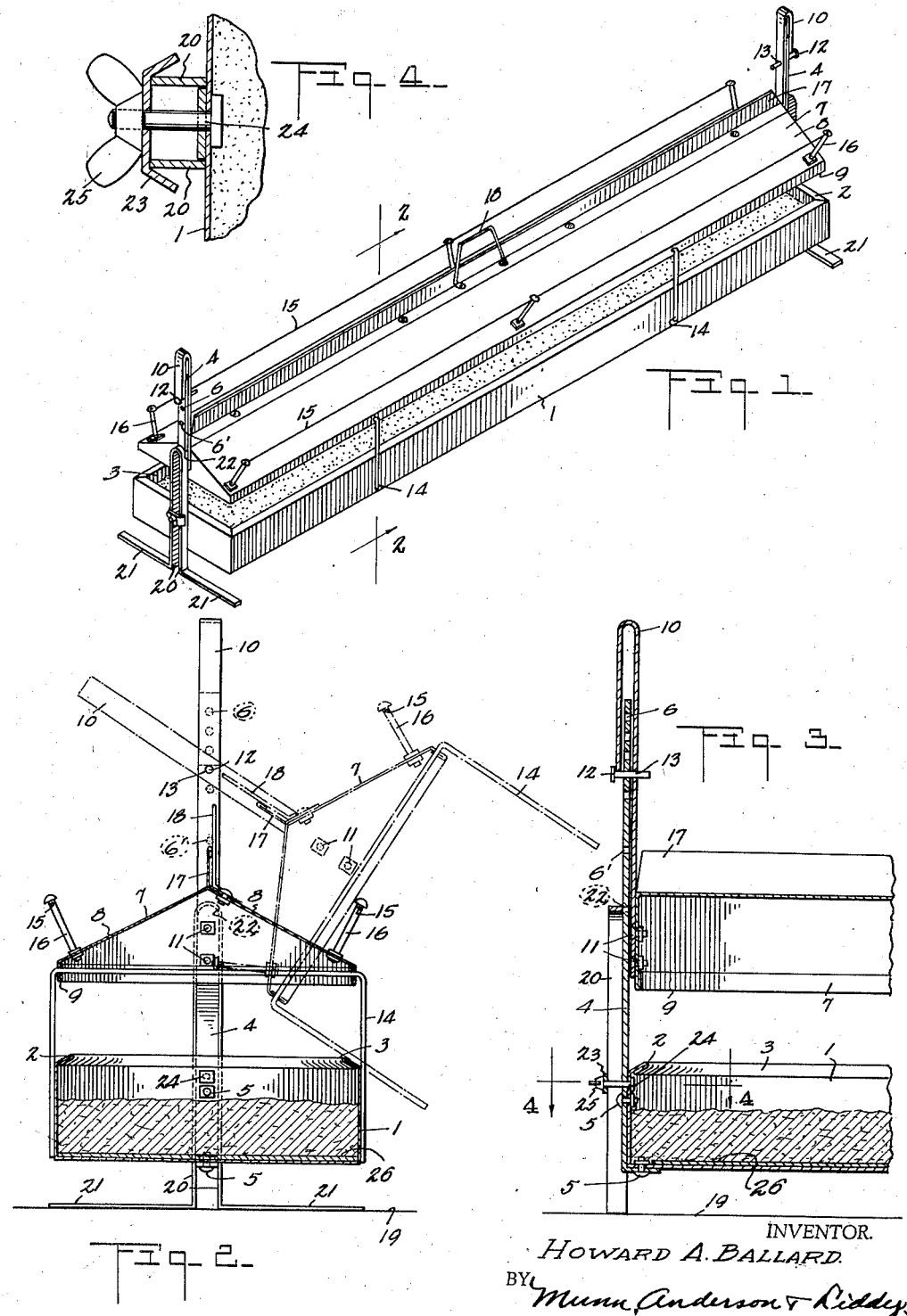

2,127,804

UNITED STATES PATENT OFFICE 2,127,804

POULTRY FEEDER

Howard A. Ballard, Napa, Calif.

Application March 9, 1936, Serial No. 67,858

7 Claims. (Cl. 119—61)

My invention relates to improvements in poultry feeders, and it consists of the combinations, constructions and arrangements hereinafter described and claimed.

An object of my invention is to provide a poultry feeder which includes a trough for holding the feed and a lid or cover which has an area equal to the trough opening, and which is adjustable toward or away from the trough. The lid when adjusted provides a space or slot entirely surrounding the trough, this space being made large enough to receive only the heads of the poultry. This prevents the poultry from gaining access to the feed and contaminating it with their feet. The space between the cover and the trough is adjustable as the poultry grow and the device is designed to take care of poultry from one day old up to two months old.

The trough also is adjustable above a floor or supporting surface by legs. The legs permit the trough to be raised from a position level with the floor to a position approximately five inches above the floor.

The lid or cover not only is adjustable toward and away from the trough but it also may be swung into an angular position which will permit the trough to be cleaned or new feed to be added. In this connection I make use of U-shaped wires hinged to the lid and designed to straddle the trough for holding the lid in a horizontal position. These wires are swung into a horizontal position when the lid is opened. In opening the lid it is swung either to one side or the other of the trough, and then is held in an inclined position by the U-shaped wires which are now moved into a position at right angles to the plane of the lid and the wires rest on the side of the trough.

The device is extremely simple in construction, and is durable and efficient for the purpose intended. A handle is secured to the lid and the entire feeder can be moved from place to place by means of the handle.

Other objects and advantages will appear in the following specification, and the novel features of the device will be particularly pointed out in the appended claims.

My invention is illustrated in the accompanying drawing forming a part of this application, in which Figure 1 is an isometric view of the feeder;

Figure 2 is a section along the line 2—2 of Figure 1;

Figure 3 is a longitudinal section through one end of the feeder; and

Figure 4 is a section along the line 4—4 of Figure 3.

In carrying out my invention I provide a trough-shaped member 1, and this member has an inclined rim 2, see Figure 2, that defines an opening 3 in the top of the trough. The trough preferably is made of sheet metal, although I do not wish to be confined to any particular type of material. The sides of the trough may be secured to each other by crimping, spot welding, or the like.

In Figure 3 I show an L-shaped strap 4 secured to the end of the trough by bolts 5. These straps extend above the trough and are provided with a number of openings 6. In the present form of the device I have shown two straps 4, and each strap is provided with five openings spaced half an inch apart, and a sixth opening 6' spaced further down on the strap.

The cover indicated generally at 7, see Figure 2, is provided with inclined upper surfaces 8, and a rim 9. Figure 3 shows U-straps 10 secured to the ends of the cover by bolts 11, or other suitable fastening means. The U-straps enclose the upper ends of the straps 4 and are pivotally secured to the straps 4 by pins 12 that are inserted through openings 6 and through an opening 13 in the U-strap 10. It will be seen from this construction that the cover or lid 7 may be raised or lowered with respect to the trough 1 and secured in adjusted position by the pins 12.

In order to prevent the cover 7 from swinging about the pins 12 as a pivot, I provide U-shaped members 14 and pivot these to the rim 9 of the cover 7. Figure 2 shows the U-shaped members 14 as being wide enough to straddle the trough 1. Figure 1 shows two U-members 14 secured to the cover 7. When the U-members straddle the trough they will prevent the cover from swinging with respect to the trough.

Figure 2 further shows how the U-members 14 are used for supporting the cover in opened position. To accomplish this the U-members 14 will swing so that the leg portions clear the trough 1. The cover 7 now may be swung into the dotted line position shown in Figure 2 and then the legs of the U-members 14 may be moved back into a position at right angles to the plane of the cover. The lowermost legs of the U-members will now rest on the inclined rim 2 when the cover 7 is lowered, and will support the cover in open position. When the cover is in this position the trough may be cleaned and new feed added.

Figure 1 also shows wires 15 supported by bolts 16 or other suitable supporting means. These wires extend throughout the length of the cover, and are for the purpose of cleaning the bills of the poultry. The birds will pick at the wires, and in this manner clean their bills. I have found that in young poults, i. e. young turkeys, the provision of the wires 15 will prevent the birds from pulling out the tail feathers of other birds. In this way the turkeys, when reaching maturity, will present a better appearance. I also provide a flange 17 on the top of the cover 7, and this flange is provided with a thin edge so as to discourage the birds from roosting on the device. A handle 18 also is secured to the cover at its midportion, and this permits the device to be quickly transported from place to place.

The trough 1 is adjustable with respect to the supporting surface 19. I provide U-shaped legs 20 with outstanding base portions 21. These legs straddle the straps 4 and the legs are provided with slots 22 for receiving the straps. In Figure 4 I show a clamping plate 23 frictionally engaging the legs 20. This plate 23 is held in place by means of a bolt 24 that extends from the end of the trough 1, and is provided with a wing nut 25. This construction permits the trough to be raised from a position adjacent to the floor to one approximately five inches above the floor. The tightening of the wing nuts 25 will hold the trough in adjusted position on the legs 20.

From the foregoing description of the various parts of the device the operation thereof may be readily understood.

The device is designed primarily to be adjustable and to take care of young chickens or turkeys while they are growing. The device does away with the necessity of providing a number of feeding devices of different sizes. The trough 1 is movable from a position on the floor to one approximately five inches above the floor, which takes care of chickens or turkeys when one day old up to two months old. The base portions 21 prevent the trough from being accidentally tipped over even when the trough is supported a distance of five inches above the floor.

Another principal advantage of the device is to protect the feed against dirt while at the same time giving free access to the young chickens or turkeys. The openings 6 control the space between the rim 9 of the cover 7 and the rim 2 of the trough 1. This space is approximately one and one-half inches wide when the poultry is one day old, and is gradually increased until it is three inches wide when the poultry is two months old. The space only permits the heads of the poultry to enter and this keeps the feed clean from dirt and the like. The device therefore is sanitary because it prevents the birds from entering the trough.

I am well aware of revolving reels placed above a trough but I am not aware of a cover that is adjustable above a trough, this cover being normally held against swinging motion and entirely covering the open top of the trough. It should be noted further that when the pin 12 is inserted through the opening 6' the cover 7 rests on the trough 1 and protects the feed against mice and rats. Moreover, the cover permits the device to be used outside even in rainy weather, and will protect the feed. Should a sudden storm arise, and it is desired to close the troughs quickly, the pins 12 may be removed thus allowing the covers to drop down over the troughs. This can be done quickly and obviates the necessity of carrying the device into a sheltered place.

Another advantage of the device is that feeding space for the poultry is provided at the ends of the trough. The only obstruction at the ends of the trough consists of the legs 20. Although the trough is large it is so designed that the poultry can eat the feed down to the trough bottom which permits small particles of dried milk and other ingredients, that are needed badly by the poultry, to be eaten. Since the feed is protected at all times, it will be seen that the poultry cannot contaminate the feed which prevents the spreading of any disease through the flock.

The poultry feeder may be filled from either side and the cover 7 is swung into the inclined position shown in Figure 2 when the trough is filled. This provides the trough with sufficient opening that a pail may be used in filling the trough with feed. The side 8 of the cover 7 disposed nearest the trough acts as a baffle or a guide in directing the feed into the trough. Although one U-shaped member 14 will function to hold the cover open or closed, I have found that the use of two members will function more efficiently. The adjustment of the cover to vary the size of the slot opening between the cover and the trough should be made when the cover is in a horizontal position. One adjustment permits the device to be used several days when the poultry is young, and later on a single adjustment will permit the device to be used several weeks. The poultry that uses the device should all be of the same age and the device should be adjusted for the average size of all the birds. Usually there are from three to four runts for each one hundred birds, and these can be eliminated from the flock rather than to adjust the device to take care of them. If desired two sizes of feeder may be used, one for chickens and the other for turkeys.

If the person using the device wishes to prevent the poultry from picking on the metal bottom of the trough, he can provide the bottom with a thin piece of plywood 26, see Figures 2 and 3. The plywood board is used in place of a wooden bottom for the trough in order to save weight and also to save feed space since a wooden bottom would have to be much thicker than the thin plywood board 26. Moreover, a wooden bottom might warp, shrink or split from weather conditions. The feeders are especially designed to feed young birds and to prevent the older ones from eating. The device can be shipped in a knockdown condition, and the only tools necessary to assemble it are a screw driver and a pair of pliers.

If desired, a wire cloth or grid 27 of fourteen gage wire may be placed on the mouth of the trough, and this prevents the birds from scattering feed when eating. In filling the trough, the wire cloth or grid preferably is placed on top of the open lid to keep it clean.

While I have shown only the preferred form of my invention, it should be understood that various changes or modifications may be made within the scope of the appended claims without departing from the spirit of the invention.

I claim:

1. A poultry feeder comprising a feed trough with an open top, a cover for closing the trough top when the cover is supported by the trough, means for pivotally supporting the cover above the trough, and U-shaped members pivotally secured to the cover and normally straddling the trough for holding the cover against swinging, said members being movable for clearing the trough for permitting the cover to be swung into open position, said members then being movable to engage with a side of the trough for holding the cover open.

2. A poultry feeder comprising a trough with an inwardly inclined upper edge surrounding the open top of the trough, straps secured to the trough ends and being provided with a plurality of openings, a cover for the trough, other straps connected to the cover ends, pins inserted in the openings of the first-named straps and pivotally supporting the second-named straps, and U-shaped members pivotally connected to the cover and normally straddling the trough for holding the cover against swinging, said U-shaped members being swingable for permitting the cover to be swung into open position, and then engaging with the trough side for holding the cover in open position.

3. A poultry feeder comprising a trough, a strap iron secured to each end of the trough and extending a considerable distance above the top of the trough, U-shaped legs straddling the straps, adjustable clamping means for securing the legs to the trough for supporting the trough at the desired elevation above the ground and for preventing lateral movement of the trough with respect to the legs, a cover for the trough, a second set of strap irons secured to the ends of the cover, and means adjustably connecting the strap irons together for supporting the cover at the desired height above the trough irrespective of the height of the trough above the ground.

4. A poultry feeder comprising a trough, straps secured to the trough ends and projecting a considerable distance above the trough, said straps having a plurality of holes therein, a cover for the trough, straps secured to the cover ends and projecting a considerable distance above the cover, and pins carried by the last named straps at a point above the cover and being insertable in the desired openings in the first named straps for supporting the cover above the trough.

5. A poultry feeder comprising a trough, straps secured to the trough ends and projecting a considerable distance above the trough, said straps having a plurality of holes therein, a cover for the trough, straps secured to the cover ends and projecting a considerable distance above the cover, and pins carried by the last named straps at a point above the cover and being insertable in the desired openings in the first named straps for supporting the cover above the trough, said cover depending below the pins and being swingable thereabout from a position overlying the trough into one exposing the greater portion of the trough top, and U-shaped members pivotally connected to the cover and normally straddling the trough for holding the cover against swinging.

6. A poultry feeder comprising a trough provided with a rectangular open top, a cover for the top and having its lower edges lying in the same plane, and means for supporting the cover at points above the trough and cover, and at the desired distance above the trough top, said supporting means being secured to the trough at its ends and midway between the trough sides, whereby adjustable headroom of the same height is provided for the poultry along the sides and ends of the trough.

7. A poultry feeder comprising a feed trough with an open top, a cover designed to completely close the open top, straps connected to the trough ends and extending a considerable distance above the trough, a second set of straps connected to the cover ends and extending thereabove, said first named straps having a plurality of openings therein, and the second straps having a single opening therein disposed a considerable distance above the cover, and pins insertable through the desired openings in the first straps and in the desired opening in each of the second straps for securing the cover tightly on the trough or for supporting it the desired distance above the trough.

HOWARD A. BALLARD.